UNITED STATES PATENT OFFICE 2,443,136

PHOTOGRAPHIC ELEMENTS CONTAINING 1,3,4-TRIAZAINDOLIZINE CYANINE DYES

Newton Heimbach, Binghamton, N. Y., assignor to General Aniline & Film Corporation, New York, N. Y., a corporation of Delaware No Drawing. Application April 11, 1946
Serial No. 661,353

4 Claims. (Cl. 260—240)

This invention relates to new asymmetrical dyes of the 1,3,4-triazaindolizine type, which are particularly useful for sensitizing photographic emulsions, and to photographic silver-halide emulsions containing these dyes.

In the preparation of cyanine sensitizing dyes, a large variety of heterocyclic bases have been used in the form of their quaternary salts to obtain dyestuffs with varying degrees of sensitizing activity and sensitizing ranges. A wide choice of symmetrical and asymmetrical dyes is possible by a suitable choice of intermediates. Moreover, similar bases are used in combination with a variety of heterocyclic compounds containing active methylene groups to produce merocyanine dyes.

The quaternary dyestuffs obtained from nonquaternary nitrogen-containing heterocyclic bases such as thiazoles, oxazoles, selenazoles, quinaldines and the like, for the most part, have extremely low water solubility and, accordingly, are not always readily removed from the photographic layers in aqueous processing baths. The residual dye stain is particularly undesirable in photographic films and papers. Moreover, it may frequently be desirable to use such dyes as screening or filter layers, in which case large concentrations of the dyes are necessary. Such applications are often limited by the difficulty of removal of dyestuff from the layer during the processing operations because of low water solubility.

Previous proposals to obtain dyestuffs of suitable water solubility were largely dependent upon a choice of the particular quaternary salt used. For example, acid groups such as α-halogen acetic acids have been introduced during quaternation to increase solubility.

It is an object of the present invention to provide asymmetrical photo-sensitizing dyestuffs containing a 1,3,4-triazaindolizine nucleus.

A further object is to provide such dyes which are added to photographic silver-halide emulsions or coated thereon as an overcoating whereby the sensitivity of the emulsion is increased.

A still further object is to provide photo-sensitizing dyestuffs having appreciable water solubility and readily removed from the exposed emulsion layer during processing.

Other objects will appear hereinafter.

I have discovered that the bases of 1,3,4-triazaindolizine give rise to several different series of cyanine dyes, all of which are excellent sensitizers for photographic emulsions. The bases, which are numbered in accordance with Beilstein and accepted usage, have the following general formula:

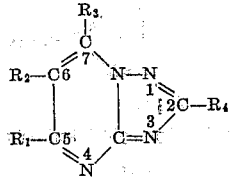

wherein $R_1$ represents an alkyl group, e. g., methyl or ethyl, $R_2$ represents hydrogen, alkyl, e. g., methyl, ethyl, propyl, butyl, and the like, carbalkoxy, e. g., carbmethoxy, carbethoxy, carbpropoxy and the like, aryl, e. g., phenyl, tolyl, phenethyl, naphthyl, diphenyl and the like, and $R_3$ and $R_4$ represent hydrogen, alkyl and aryl as in $R_2$, aralkyl, e. g., benzyl, methyl benzyl, ethyl benzyl, etc., alkoxyphenyl, e. g., methoxyphenyl, ethoxyphenyl, propoxyphenyl and the like, dialkoxyphenyl, e. g., dimethoxyphenyl, diethoxyphenyl, dipropoxyphenyl, and the like.

The compounds numbered from 1 to 6, 9 to 14, and 16 to 22 are prepared by heating a 3-amino-1,2,4-triazole with an appropriate β-diketone in absolute alcohol in the presence of a small quantity of an organic base such as triethylamine or piperidine. The actual method employed in this synthesis is described in Berichte 42, 4638–4644 and Berichte 43, 375–381. Compounds numbered 7, 8 and 15 are prepared by heating the same triazole with ethyl ethoxymethylene-acetoacetate in glacial acetic acid.

The bases represented by the above general formula and prepared in accordance with the above references and procedure are as follows:

(1)

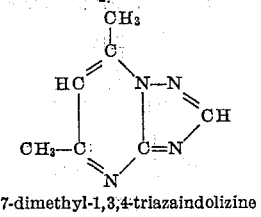

5,7-dimethyl-1,3,4-triazaindolizine (2)

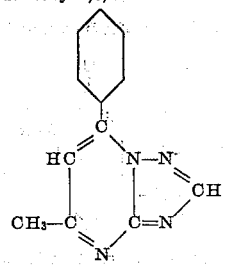

5-methyl-7-phenyl-1,3,4-triazaindolizine (3) 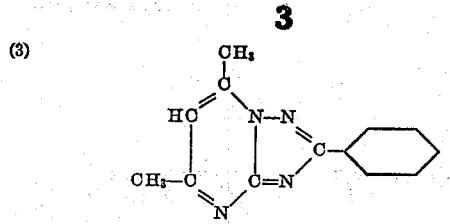
5,7-dimethyl-2-phenyl-1,3,4-triazaindolizine (4) 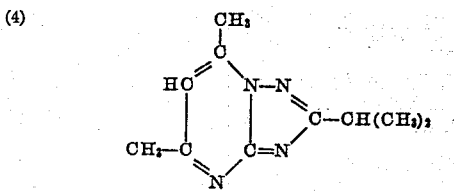
5,7-dimethyl-2-isopropyl-1,3,4-triazaindolizine (5) 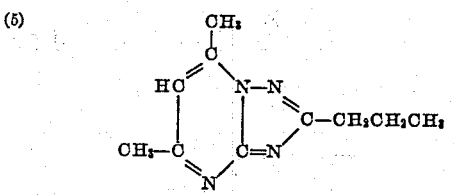
5,7-dimethyl-2-propyl-1,3,4-triazaindolizine (6) 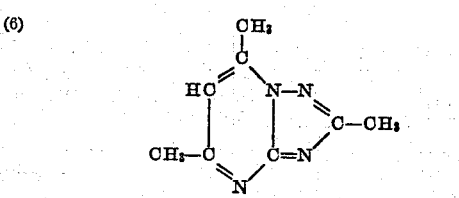
2,5,7-trimethyl-1,3,4-triazaindolizine (7) 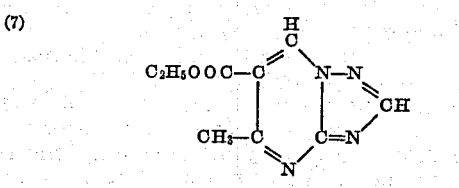
6-carbethoxy-5-methyl-1,3,4-triazaindolizine (8) 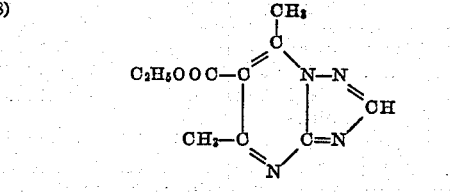
6-carbethoxy-5,7-dimethyl-1,3,4-triazaindolizine (9) 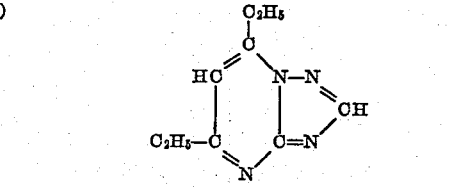
5,7-diethyl-1,3,4-triazaindolizine

(10) 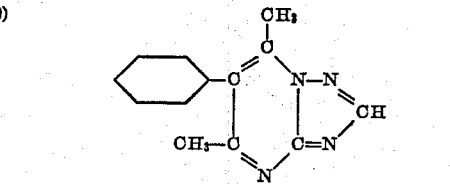
5,7-dimethyl-6-phenyl-1,3,4-triazaindolizine

(11) 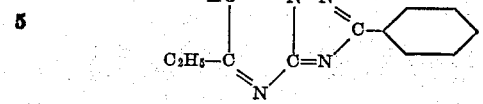
5,7-diethyl-2-phenyl-1,3,4-triazaindolizine

(12) 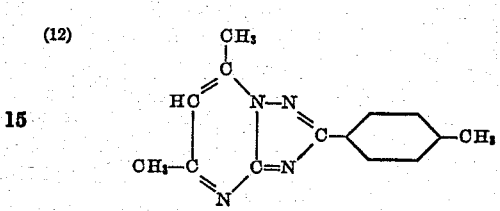
5,7-dimethyl-2-p-tolyl-1,3,4-triazaindolizine

(13) 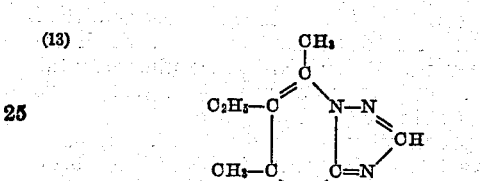
6-ethyl-5,7-dimethyl-1,3,4-triazaindolizine

(14) 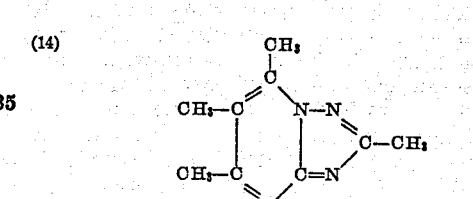
2,5,6,7-tetramethyl-1,3,4-triazaindolizine

(15) 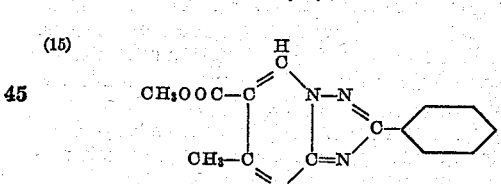
6-carbomethoxy-5-methyl-2-phenyl-1,3,4-triazaindolizine

(16) 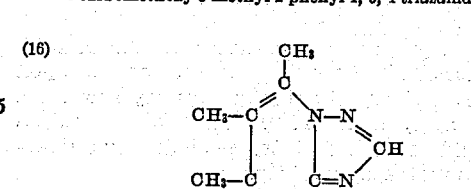
5,6,7-trimethyl-1,3,4-triazaindolizine

(17) 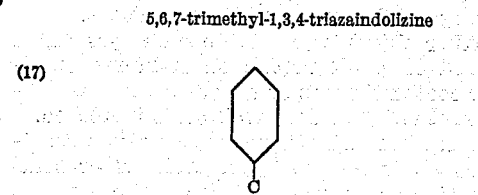

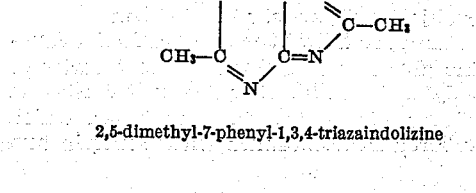
2,5-dimethyl-7-phenyl-1,3,4-triazaindolizine

(18) 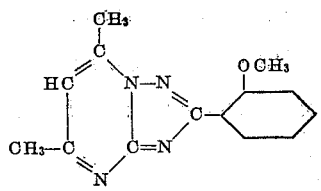
5,7-dimethyl-2-[2-methoxyphenyl]-1,3,4-triazaindolizine

(19) 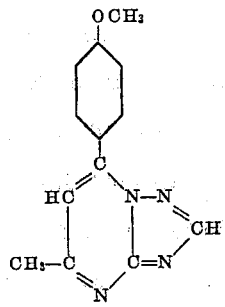
5-methyl-7-[4-methoxyphenyl]-1,3,4-triazaindolizine

(20) 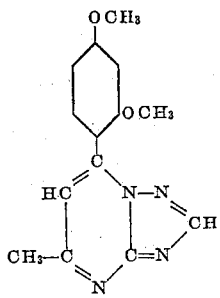
5-methyl-7-[2,4-dimethoxyphenyl]-1,3,4-triazaindolizine

(21) 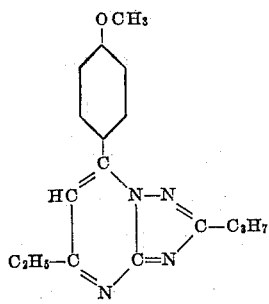
5-ethyl-7-[4-methoxyphenyl]-2-propyl-1,3,4-triazaindolizine

(22) 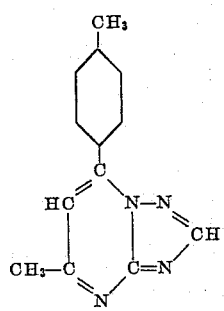
5-methyl-7-p-tolyl-1,3,4-triazaindolizine

These bases readily form hydrocarbon quaternary salts, e. g., alkyl or aralkyl quaternary salts such as the methiodide, ethiodide, phenethyl iodide, metho-p-toluenesulfonate and the like in the known manner, and undergo a condensation with any of the known cyclammonium quaternary cyanine dye salt intermediates containing a reactive group.

The dyestuffs derived from the alkyl or aralkyl quaternary salts of 1,3,4-triazaindolizines and cyclammonium quaternary cyanine dye salt intermediates have the following general formulae:

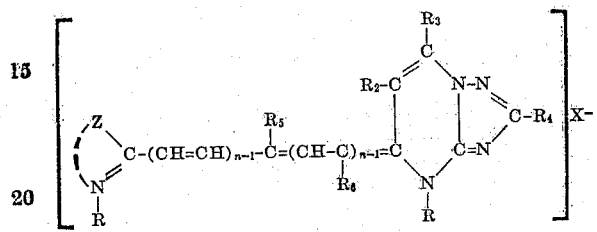

and

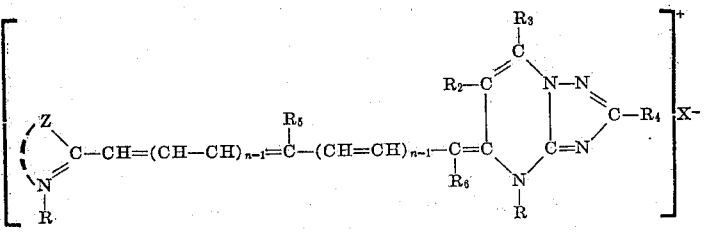

wherein R is a hydrocarbon group, for example, alkyl group, e. g. methyl, ethyl, propyl, butyl, amyl, and the like, or aralkyl group, e. g., benzyl, phenethyl, and the like, $R_2$, $R_3$ and $R_4$ have the same values as given above, $R_5$ is either hydrogen, alkyl, e. g., methyl, ethyl, propyl, butyl, and the like, $R_6$ is either hydrogen, or a methyl group, X represents an anionic acid radical, e. g., Cl, Br, I, $ClO_4$, $SO_4CH_3$, $SO_4C_2H_5$, $SO_3C_6H_4CH_3$ and the like, Z represents the atoms necessary to complete a nitrogenous heterocyclic system of the type usual in cyanine dyes such as pyridine, lepidine, quinoline, indoline, oxazole, thiazoline, thiazole, thiodiazole, selenazole, selenazoline, oxazoline, benzothiazole, benzoselenazole, benzoxazole, naphthothiazole, naphthoselenazole, and the like, and n represents a positive integer ranging from 1 to 2.

Using the alkyl or aralkyl quaternary salts of 1,3,4-triazaindolizine, the following cyclammonium quateranary cyanine dye salt intermediates are employed in preparing mono- and polymethine dyes.

MONOMETHINE

As examples of suitable cyclammonium quaternary cyanine dye salt intermediates, having a reactive group in 2-position to the nitrogen atom thereof, the following may be mentioned:

2-methylmercaptopyridine ethiodide
2-methylmercaptoquinoline ethiodide
2-methylmercaptothiazoline ethiodide
2-methylmercaptobenzothiazole ethiodide
2-methylmercaptobenzoselenazole ethiodide
2-methylmercaptobenzoxazole ethiodide
2-methylmercaptonaphthothiazole ethiodide
2-methylmercaptonaphthoselenazole ethiodide
2-methylmercaptonaphthoxazole ethiodide
2-phenylmercaptopyridine ethiodide
2-phenylmercaptoquinoline ethiodide
2-phenylmercaptothiazoline ethiodide
2-phenylmercaptobenzothiazole ethiodide 2-phenylmercaptobenzoselenazole ethiodide
2-phenylmercaptobenzoxazole ethiodide
2-phenylmercaptonaphthothiazole ethiodide
2-phenylmercaptonaphthoselenazole ethiodide
2-phenylmercaptonaphthoxazole ethiodide
2-phenylmethylmercaptopyridine ethiodide
2-phenylmethylmercaptoquinoline ethiodide
2-phenylmethylmercaptothiazoline ethiodide
2-phenylmethylmercaptobenzothiazole ethiodide
2-phenylmethylmercaptobenzoselenazole ethiodide
2-phenylmethylmercaptobenzoxazole ethiodide
2-phenylmethylmercaptonaphthothiazole ethiodide
2-phenylmethylmercaptonaphthoselenazole ethiodide
2-phenylmethylmercaptonaphthoxazole ethiodide
2-iodo pyridine ethiodide
2-iodo quinoline ethiodide
2-iodo thiazoline ethiodide
2-iodo benzothiazole ethiodide
2-iodo benzoselenazole ethiodide
2-iodo benzoxazole ethiodide
2-iodo naphthothiazole ethiodide
2-iodo naphthoselenazole ethiodide
2-iodo naphthoxazole ethiodide

Trimethine

*(Straight chain carbocyanine)*

The following are suitable examples of cyclammonium quaternary cyanine dye salt intermediates having a reactive group in beta-position of the side chain in 2-position of the nitrogen atom thereof:

2-($\beta$-acetanilidovinyl)-pyridine ethiodide
2-($\beta$-acetanilidovinyl)-quinoline ethiodide
2-($\beta$-acetanilidovinyl)-thiazoline ethiodide
2-($\beta$-acetanilidovinyl)-benzothiazole ethiodide
2-($\beta$-acetanilidovinyl)-benzoselenazole ethiodide
2-($\beta$-acetanilidovinyl)-benzoxazole ethiodide
2-($\beta$-acetanilidovinyl)-naphthothiazole ethiodide
2-($\beta$-acetanilidovinyl)-naphthoselenazole ethiodide
2-($\beta$-acetanilidovinyl)-naphthoxazole ethiodide
2-($\beta$-methylmercaptovinyl)-3,3-dimethylindolenine ethiodide
2-formylmethylene-1-ethylthiazoline

*(Branched chain carbocyanine)*

2-($\beta$-methylmercapto-$\beta$-methyl vinyl)-benzothiazole ethiodide
2-($\beta$-methylmercapto-$\beta$-methyl vinyl)-benzoselenazole ethiodide
2-($\beta$-methylmercapto-$\beta$-ethyl vinyl)-benzothiazole ethiodide
2-($\beta$-methylmercapto-$\beta$-ethyl vinyl)-benzoselenazole ethiodide
2-($\beta$-methylmercapto-$\beta$-propyl vinyl)-benzothiazole ethiodide
2-($\beta$-methylmercapto-$\beta$-propyl vinyl)-benzoselenazole ethiodide

Pentamethine

*(Straight chain)*

The following are examples of cyclammonium quaternary cyanine dye salt intermediates having a reactive group in delta-position of the side chain in 2-position of the nitrogen atom thereof:

2-(4-anilino-1,3-butadienyl)pyridine ethiodide
2-(4-anilino-1,3-butadienyl)quinoline ethiodide
2-(4-anilino-1,3-butadienyl)thiazoline ethiodide
2-(4-anilino-1,3-butadienyl)benzothiazole ethiodide
2-(4-anilino-1,3-butadienyl)benzoselenazole ethiodide
2-(4-anilino-1,3-butadienyl)benzoxazole ethiodide
2-(4-anilino-1,3-butadienyl)naphthothiazole ethiodide
2-(4-anilino-1,3-butadienyl)naphthoselenazole ethiodide
2-(4-anilino-1,3-butadienyl)naphthoxazole ethiodide
2-(4-acetanilido-1,3-butadienyl)-pyridine ethiodide
2-(4-acetanilido-1,3-butadienyl)-quinoline ethiodide
2-(4-acetanilido-1,3-butadienyl)-thiazoline ethiodide
2-(4-acetanilido-1,3-butadienyl)-benzothiazole ethiodide
2-(4-acetanilido-1,3-butadienyl)-benzoselenazole ethiodide
2-(4-acetanilido-1,3-butadienyl)-benzoxazole ethiodide
2-(4-acetanilido-1,3-butadienyl)-$\alpha$-naphthothiazole ethiodide
2-(4-acetanilido-1,3-butadienyl)-$\alpha$-naphthoselenazole ethiodide
2-(4-acetanilido-1,3-butadienyl)-$\beta$-naphthoxazole ethiodide
2-(4-ethoxy-1,3-butadienyl)-pyridine ethiodide
2-(4-ethoxy-1,3-butadienyl)-quinoline ethiodide
2-(4-ethoxy-1,3-butadienyl)-thiazoline ethiodide
2-(4-ethoxy-1,3-butadienyl)-benzothiazole ethiodide
2-(4-ethoxy-1,3-butadienyl)-benzoxazole ethiodide
2-(4-ethoxy-1,3-butadienyl)-$\beta$-naphthothiazole ethiodide
2-(4-ethoxy-1,3-butadienyl)-$\beta$-naphthoxazole ethiodide
2-(3-formyl-2-propenylidene)-1-ethyl-pyridine
2-(3-formyl-2-propenylidene)-1-ethyl-quinoline
2-(3-formyl-2-propenylidene)-3-ethyl thiazole
2-(3-formyl-2-propenylidene)-3-ethyl benzothiazole
2-(3-formyl-2-propenylidene)-3-ethyl benzoselenazole
2-(3-formyl-2-propenylidene)-3-ethyl benzoxazole
2-(3-formyl-2-propenylidene)-3-ethyl naphthothiazole
2-(3-formyl-2-propenylidene)-3-ethyl naphthoselenazole
2-(3-formyl-2-propenylidene)-3-ethyl naphthoxazole

*(Branched chain)*

2-(4-anilino-3-methyl-1,3-butadienyl)-pyridine ethiodide
2-(4-anilino-3-methyl-1,3-butadienyl)-quinoline ethiodide
2-(4-anilino-3-methyl-1,3-butadienyl)-thiazoline ethiodide
2-(4-anilino-3-methyl-1,3-butadienyl)-benzothiazole ethiodide
2-(4-anilino-3-methyl-1,3-butadienyl)-benzoxazole ethiodide
2-(4-anilino-3-methyl-1,3-butadienyl)-$\alpha$-naphthiazole ethiodide
2-(4-anilino-3-methyl-1,3-butadienyl)-$\beta$-naphthoxazole ethiodide
2-(4-anilino-3-ethyl-1,3-butadienyl)-pyridine ethiodide
2-(4-anilino-3-ethyl-1,3-butadienyl)-quinoline ethiodide
2-(4-anilino-3-ethyl-1,3-butadienyl)-thiazoline ethiodide 2-(4-anilino-3-ethyl-1,3-butadienyl)-benzothiazole ethiodide
2-(4-anilino-3-ethyl-1,3-butadienyl)-benzoxazole ethiodide
2-(4-anilino-3-ethyl-1,3-butadienyl)-α-naphthothiazole ethiodide
2-(4-anilino-3-ethyl-1,3-butadienyl)-β-naphthoxazole ethiodide
2-(4-anilino-3-propyl-1,3-butadienyl)-pyridine ethiodide
2-(4-anilino-3-propyl-1,3-butadienyl)-quinoline ethiodide
2-(4-anilino-3-propyl-1,3-butadienyl)-thiazoline ethiodide
2-(4-anilino-3-propyl-1,3-butadienyl)-benzothiazole ethiodide
2-(4-anilino-3-propyl-1,3-butadienyl)-benzoxazole ethiodide
2-(4-anilino-3-propyl-1,3-butadienyl)-α-naphthothiazole ethiodide
2-(4-anilino-3-propyl-1,3-butadienyl)-β-naphthoxazole ethiodide
2-(4-anilino-3-butyl-1,3-butadienyl)-pyridine ethiodide
2-(4-anilino-3-butyl-1,3-butadienyl)-quinoline ethiodide
2-(4-anilino-3-butyl-1,3-butadienyl)-thiazoline ethiodide
2-(4-anilino-3-butyl-1,3-butadienyl)-benzothiazole ethiodide
2-(4-anilino-3-butyl-1,3-butadienyl)-benzoxazole ethiodide
2-(4-anilino-3-butyl-1,3-butadienyl)-α-naphthiazole ethiodide
2-(4-anilino-3-butyl-1,3-butadienyl)-β-naphthoxazole ethiodide

HEPTAMETHINE (Straight chain)

The following are examples of suitable cyclammonium quaternary cyanine dye salt intermediates having a reactive group in omega-position of the side chain in 2-position of the nitrogen atom thereof:

2-(6-anilino-1,3,5-hexatrienyl)-pyridine ethiodide
2-(6-anilino-1,3,5-hexatrienyl)-quinoline ethiodide
2-(6-anilino-1,3,5-hexatrienyl)-thiazoline ethiodide
2-(6-anilino-1,3,5-hexatrienyl)-benzothiazole ethiodide
2-(6-anilino-1,3,5-hexatrienyl)-benzoselenazole ethiodide
2-(6-anilino-1,3,5-hexatrienyl)-benzoxazole ethiodide
2-(6-anilino-1,3,5-hexatrienyl)-naphthothiazole ethiodide
2-(6-anilino-1,3,5-hexatrienyl)-naphthoselenazole ethiodide
2-(6-anilino-1,3,5-hexatrienyl)-naphthoxazole ethiodide
2-(5-formyl-2,4-pentadienylidene)-1-ethyl-pyridine
2-(5-formyl-2,4-pentadienylidene)-1-ethyl-quinoline
2-(5-formyl-2,4-pentadienylidene)-3-ethyl thiazoline
2-(5-formyl-2,4-pentadienylidene)-3-ethyl benzothiazole
2-(5-formyl-2,4-pentadienylidene)-3-ethyl benzoselenazole
2-(5-formyl-2,4-pentadienylidene)-3-ethyl benzoxazole
2-(5-formyl-2,4-pentadienylidene)-3-ethyl naphthothiazole
2-(5-formyl-2,4-pentadienylidene)-3-ethyl naphthoselenazole
2-(5-formyl-2,4-pentadienylidene)-3-ethyl naphthoxazole (Branched chain)

2-(6-anilino-4-methyl-1,3,5-hexatrienyl)-pyridine ethiodide
2-(6-anilino-4-ethyl-1,3,5-hexatrienyl)-pyridine ethiodide
2-(6-anilino-4-propyl-1,3,5-hexatrienyl)-pyridine ethiodide
2-(6-anilino-4-butyl-1,3,5-hexatrienyl)-pyridine ethiodide
2-(6-anilino-4-methyl-1,3,5-hexatrienyl)-quinoline ethiodide
2-(6-anilino-4-ethyl-1,3,5-hexatrienyl)-quinoline ethiodide
2-(6-anilino-4-propyl-1,3,5-hexatrienyl)-quinoline ethiodide
2-(6-anilino-4-butyl-1,3,5-hexatrienyl)-quinoline ethiodide
2-(6-anilino-4-methyl-1,3,5-hexatrienyl)-thiazoline ethiodide
2-(6-anilino-4-ethyl-1,3,5-hexatrienyl)-thiazoline ethiodide
2-(6-anilino-4-propyl-1,3,5-hexatrienyl)-thiazoline ethiodide
2-(6-anilino-4-butyl-1,3,5-hexatrienyl)-thiazoline ethiodide
2-(6-anilino-4-methyl-1,3,5-hexatrienyl)-benzothiazole ethiodide
2-(6-anilino-4-ethyl-1,3,5-hexatrienyl)-benzothiazole ethiodide
2-(6-anilino-4-propyl-1,3,5-hexatrienyl)-benzothiazole ethiodide
2-(6-anilino-4-butyl-1,3,5-hexatrienyl)-benzothiazole ethiodide
2-(6-anilino-4-methyl-1,3,5-hexatrienyl)-benzoselenazole ethiodide
2-(6-anilino-4-ethyl-1,3,5-hexatrienyl)-benzoselenazole ethiodide
2-(6-anilino-4-propyl-1,3,5-hexatrienyl)-benzoselenazole ethiodide
2-6-anilino-4-butyl-1,3,5-hexatrienyl)-benzoselenazole ethiodide
2-(6-anilino-4-methyl-1,3,5-hexatrienyl)-benzoxazole ethiodide
2-(6-anilino-4-ethyl-1,3,5-hexathienyl)-benzoxazole ethiodide
2-(6-anilino-4-propyl-1,3,5-hexatrienyl)-benzoxazole ethiodide
2-(6-anilino-4-butyl-1,3,5-hexatrienyl)-benzoxazole ethiodide
2-(6-anilino-4-methyl-1,3,5-hexatrienyl)-naphthothiazole ethiodide
2-(6-anilino-4-ethyl-1,3,5-hexatrienyl)-naphthothiazole ethiodide
2-(6-anilino-4-propyl-1,3,5-hexatrienyl)-naphthothiazole ethiodide
2-(6-anilino-4-butyl-1,3,5-hexatrienyl)-naphthothiazole ethiodide
2-(6-anilino-4-methyl-1,3,5-hexatrienyl)-naphthoselenazole ethiodide
2-(6-anilino-4-ethyl-1,3,5-hexatrienyl)-naphthoselenazole ethiodide
2-(6-anilino-4-propyl-1,3,5-hexatrienyl)-naphthoselenazole ethiodide
2-(6-anilino-4-butyl-1,3,5-hexatrienyl)-naphthoselenazole ethiodide 2-(6-anilino-4-methyl-1,3,5-hexatrienyl)-naphthoxazole ethiodide
2-(6-anilino-4-ethyl-1,3,5-hexatrienyl)-naphthoxazole ethiodide
2-(6-anilino-4-propyl-1,3,5-hexatrienyl)-naphthoxazole ethiodide
2-(6-anilino-4-butyl-1,3,5-hexatrienyl)-naphthoxazole ethiodide The above cyclammonium quaternary cyanine dye salt intermediates are well-known to the art, and hence the methods for their preparation will not be discussed herein. While the above dye intermediates are disclosed as being in the form of the preferred ethiodides, it is to be understood that they may also be employed in the form of the other quaternary salts previously mentioned.

In the preparation of these new dyestuffs, the 1,3,4-triazainodolizine bases are converted into their corresponding alkyl or aralkyl quaternary cyclammonium salts in the manner usual for the conversion of other nitrogenous heterocyclic bases to the quaternary salt form, i. e., by fusion with an alkyl or aralkyl halide, or by heating the base with an alkyl or aralkyl halide in a sealed tube in a water-bath under increased pressure. A molecular equivalent of the quaternary salt thus obtained is heated with a molecular equivalent of the cyclammonium quaternary cyanine dye salt intermediate in the presence of a condensing agent such as a heterocyclic nitrogenous base or an alcohol containing a small quantity of a tertiary base at reflux temperature.

As condensing agents employed in the preparation of the new dyes of the present invention, the following may be advantageously employed: heterocyclic nitrogenous bases such as pyridine, methyl pyridine, dimethyl pyridine, ethyl pyridine, ethylmethyl pyridine, trimethyl pyridine, quinoline and the like, or an alcohol such as methyl, ethyl, propyl, isopropyl, butyl, isobutyl and the like in the presence of a basic tertiary catalyst such as trimethylamine, triethylamine, and the like. In general, the amount of condensing agent used may vary within wide limits, e. g., from 1 to 25 mols. Concentrations ranging from 1 mol to about 15 mols are preferred, however.

The following examples describe in detail the methods for accomplishing the above objects, but it is to be understood that they are inserted merely for the purpose of illustration and are not to be construed as limiting the scope of the invention.

Example I

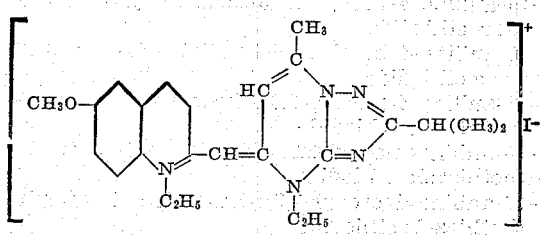

3.45 grams of 2-isopropyl-5-methyl-7-methyl-1,3,4-triazaindolizine ethiodide, 2.34 grams of 2-methyl-mercapto-6-methoxy-quinaldine ethiodide, 2 cc. of triethylamine and 15 cc. of isopropyl alcohol are refluxed for one hour. Upon cooling, the dye precipitates. The final product is filtered and recrystallized from ethanol. The dye sensitized a silver-bromoiodide emulsion to 585 m$\mu$ with a maximum at 535 m$\mu$.

Example II

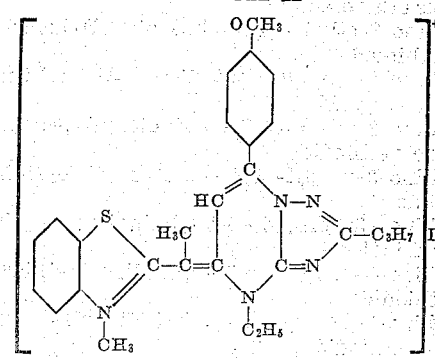

2.06 grams of 5-ethyl-7-(4-methoxyphenyl)-2-propyl-1,3,4-triazaindolizine ethiodide and 1.61 grams of 2-methyl-mercaptobenzothiazole methiodide are dissolved in 10 cc. of dry pyridine and the solution heated at reflux for about ½ hour. 10 cc. of piperidine are then added and the reaction mixture heated for about 10 minutes. The reaction mixture is cooled, the precipitate recovered and recrystallized from ethanol. The dye sensitized a silver-bromoiodide emulsion to about 590 m$\mu$ with a maximum at 540 m$\mu$.

Example III

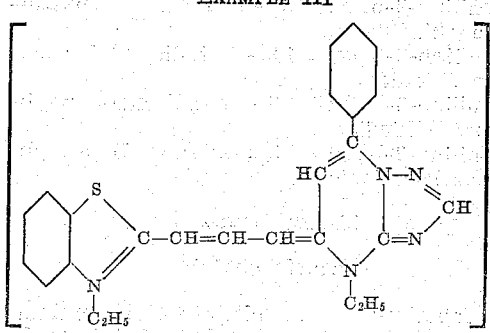

3.65 grams of 5-methyl-7-phenyl-1,3,4-triazaindolizine ethiodide and 3.04 grams of 2-$\beta$-acetanilidovinyl benzothiazole ethiodide are refluxed in 15 cc. of dry pyridine for 40 minutes. Ethyl alcohol is added to the cooled reaction mixture and after several hours of standing, the dye crystals are filtered and recrystallized from ethanol. The dye sensitized a silver-bromoiodide emulsion to 640 m$\mu$, with a maximum at 610 m$\mu$.

Example IV

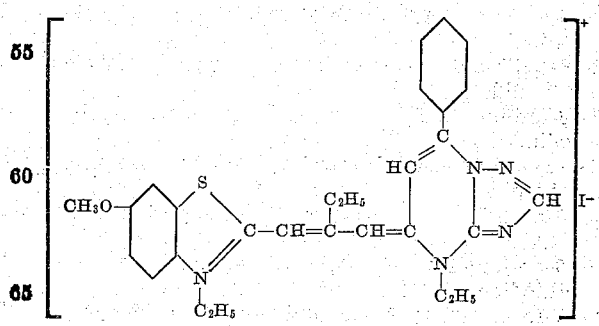

0.45 gram of 5-methyl-7-phenyl-1,3,4-triazaindolizine ethiodide, 0.39 gram of 2-($\beta$-ethyl-$\beta$-methylmercaptovinyl)-6-methoxy-benzothiazole ethiodide, 15 cc. of isopropyl alcohol and 0.2 cc. of triethylamine are refluxed for one hour. Upon cooling, the dye precipitates. The product is filtered and recrystallized from ethanol. The dye sensitized a silver-bromoiodide emulsion to 700 m$\mu$, with a maximum at 640 m$\mu$.

Example V

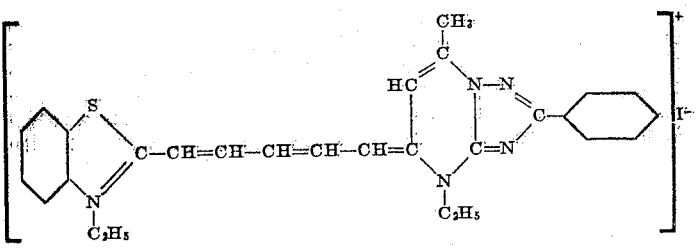

3.79 grams of 2-phenyl-5,7-dimethyl-1,3,4,-triazainodilizine ethiodide, 3.92 grams of 2-(4-ethoxy-1,3-butadienyl)-benzothiazole ethiodide, and 15 cc. of dry pyridine are refluxed for 50 minutes. Ethyl alcohol is added to the cooled reaction mixture, and after several hours of standing, the dye crystals are filtered and recrystallized from ethanol. The dye sensitized a silver-bromoiodide emulsion to 760 mμ with a maximum at 720 mμ.

Example VI

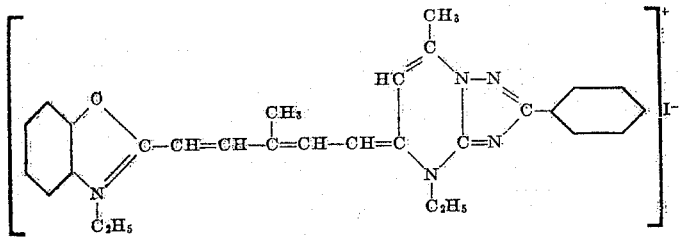

Example V was repeated with the exception that 4.17 grams of 2(4-anilino-3-ethyl-1,3-butadienyl) benzoxazole ethiodide was substituted for 3.92 grams of 2-(4-ethoxy-1,3-butadienyl)-benzothiazole ethiodide. The resulting dye sensitized a silver-bromoiodide emulsion to 720 mμ with a maximum at 680 mμ.

Example VII

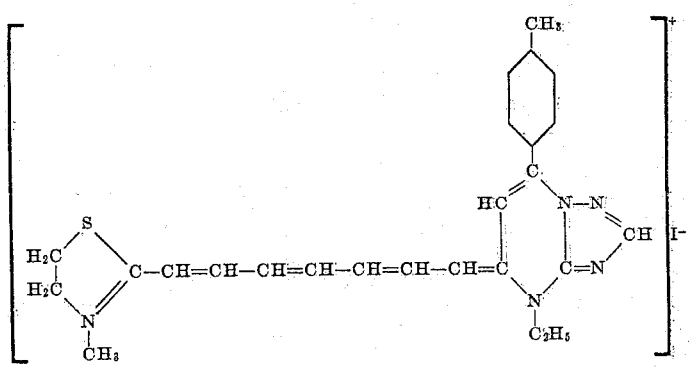

3.79 grams of 5-methyl-7-p-tolyl-1,3,4-triazaindolizine ethiodide and 3.97 grams of 2-(6-anilino-1,3,5-hexatrienyl)-thiazoline methiodide are mixed together in 8 cc. of dry pyridine. The resulting mixture is gently boiled, under reflux, for about 40 minutes. The reaction mixture is then chilled and the crystalline dye which separates out is filtered and recrystallized from methanol. The dye sensitized a silver-bromoiodide emulsion to 760 mμ with a maximum at 720 mμ.

Example VIII

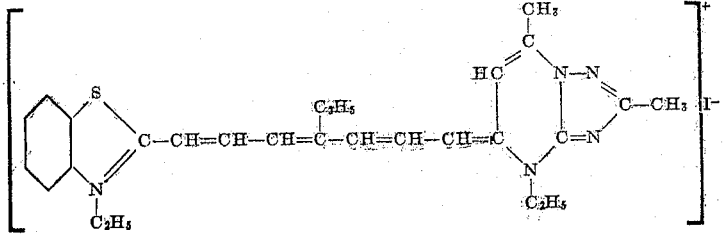

3.17 grams of 2,5,7-trimethyl-1,3,4-triazaindolizine ethiodide, 4.48 grams of 2-(6-anilino-4-ethyl-1,3,5-hexatrienyl)-benzothiazole ethiodide, and 12 cc. of dry pyridine are refluxed for 1 hour. Ethyl alcohol is added to the cooled reaction mixture and after several hours of standing, the dye crystals are filtered and recrystallized from ethanol. The dye sensitized a silver-bromoiodide emulsion to 800 m$\mu$ with a maximum at 760 m$\mu$.

EXAMPLE IX

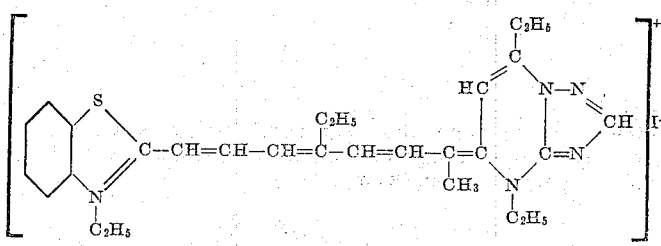

Example VIII was repeated with the exception that 3.30 grams of 5,7-diethyl-1,3,4-triazaindolizine ethiodide was substituted for 3.17 grams of 2,5,7-trimethyl-1,3,4-triazaindolizine ethiodide. The dye sensitized a silver-bromoiodide emulsion to 790 m$\mu$ with a maximum at 750 m$\mu$.

In the preparation of photographic gelatino-silver-developing-out emulsions, such as gelatino-silver-chloride, gelatino-silver chlorobromide, gelatino-silver-bromoiodide emulsions, and the like, containing the mono- and polymethine dyestuffs of the present invention, it is only necessary to disperse the dyestuffs in the emulsions. It is convenient to add the compounds from solutions in appropriate solvents. An alcohol, such as methanol or ethanol, is satisfactory as a solvent for the dyestuffs.

Emulsions prepared in accordance with this invention can be coated in the usual manner upon any desired support, such as cellulose nitrate, cellulose acetate, polyvinyl acetal resin, glass, paper and the like.

The concentration of these new dyestuffs in the emulsion can vary widely, i. e., from about 5 to about 100 mg. per liter of flowable emulsions. The concentration of the dyestuff will vary according to the type of light-sensitive material in the emulsion and according to the effect desired. The suitable and most economical concentration for any given emulsion will be apparent to those skilled in the art upon making the ordinary tests and observations customarily used in the art of emulsion making.

The new dyestuffs of the present invention have an additional advantage in that they can be employed in the manufacture of light filters, antihalation coatings and in the coloring of cellulose acetate yarn, i. e., cellulose acetate silk. This is due primarily to the increased water solubility imparted to the dyestuffs by the presence therein of the 1,3,4-triazaindolizine nucleus.

While the present invention has been described in considerable detail with respect to certain preferred procedures, materials and uses, it is understood that the new class of mono- and polymethine 1,3,4-triazaindolizine cyanines and their use as sensitizing dyes is not limited thereto and that numerous variations and modifications may be made. As for example, by condensing a quaternary salt of a 1,3,4-triazaindolizine with a dialkylaminobenzene in the presence of a basic condensing agent, e. g., piperidine, styryl dyes are obtained. All such modifications and variations are within the scope of the invention as defined by the appended claims.

I claim:

1. A dye characterized by a formula selected from the class consisting of the following formulae:

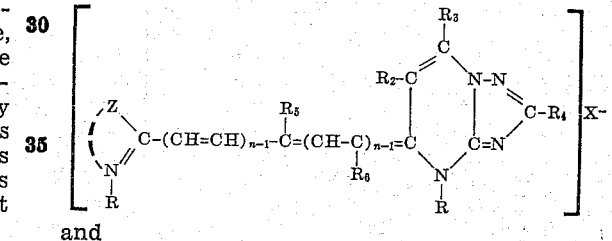

and

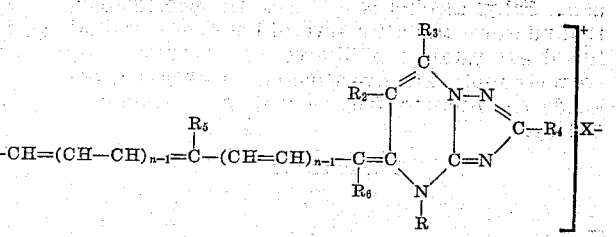

wherein R represents a member selected from the class consisting of alkyl and aralkyl groups, $R_2$ is a member selected from the class consisting of hydrogen, alkyl, carbalkoxy, and aryl groups, $R_3$ and $R_4$ represent the members selected from the class consisting of hydrogen, alkyl, aryl, aralkyl, alkoxyphenyl, and dialkoxyphenyl groups, $R_5$ is a member selected from the class consisting of hydrogen and alkyl groups, $R_6$ is a member selected from the class consisting of hydrogen and methyl group, $n$ represents a positive integer ranging from 1 to 2, X represents an anionic radical, and Z represents the atoms necessary to complete a heterocyclic nitrogenous system of the type usual is cyanine dye.

2. A dyestuff of the formula:

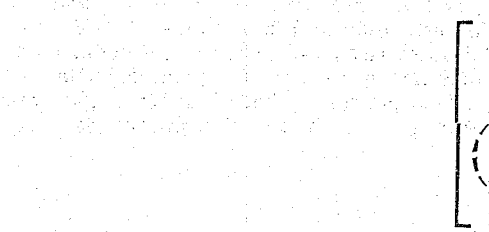

3. A dyestuff of the formula:
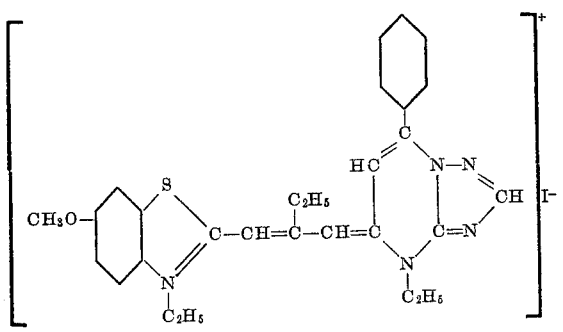
4. A dyestuff of the formula:
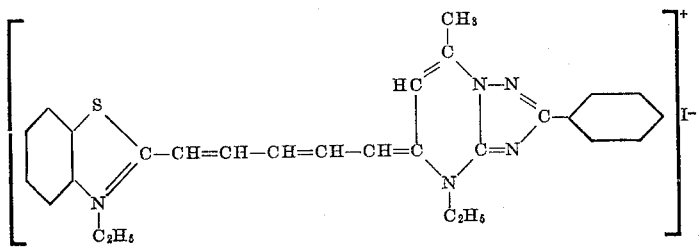
NEWTON HEIMBACH.